United States Patent [19]

Webb

[11] Patent Number: 5,072,962
[45] Date of Patent: Dec. 17, 1991

[54] FRONT/REAR MOUNTED PORTABLE LOAD-BEARING WINCH

[75] Inventor: Robert W. Webb, Tulsa, Okla.

[73] Assignee: Ramsey Winch Company, Tulsa, Okla.

[21] Appl. No.: 478,446

[22] Filed: Feb. 12, 1990

[51] Int. Cl.$^5$ ............................ B60D 1/00; B60P 3/10
[52] U.S. Cl. ..................................... 280/414.1; 280/477; 280/491.1; 280/415.1; 254/323; 414/539; 414/549
[58] Field of Search ................. 280/408, 414.1, 414.2, 280/414.3, 420, 477, 480, 186, DIG. 14, 421, 416.1, 415.1, 491.2, 491.1; 254/323; 414/539, 549

[56] References Cited

U.S. PATENT DOCUMENTS

| | | | |
|---|---|---|---|
| 3,159,368 | 12/1964 | Ahlbin et al. .................... | 254/323 |
| 3,718,317 | 2/1973 | Hilmer ........................ | 280/511 X |
| 3,900,214 | 8/1975 | Brockelsby .................... | 280/414.1 |
| 3,989,266 | 11/1976 | Foster ........................ | 280/414.1 |
| 4,127,295 | 11/1978 | Robinson ...................... | 254/166 |
| 4,202,562 | 5/1980 | Sorenson ...................... | 280/415.1 |
| 4,331,323 | 5/1982 | Sekimori et al. ............... | 254/323 |
| 4,381,069 | 4/1983 | Kreck ........................ | 280/415.1 X |
| 4,746,137 | 5/1988 | Bolser ........................ | 280/480 |

Primary Examiner—Charles A. Marmor
Assistant Examiner—Alan M. Kagen
Attorney, Agent, or Firm—Richards, Medlock & Andrews

[57] ABSTRACT

An electrical winch mounted to a drawbar having at one end a receptacle and at the other end a stub. The winch drawbar can be connected between a vehicle hitch and a ball-type hitch member which is then adapted for supporting pulling and downward loads. A trailer can be connected to the ball so that the winch can be utilized to pull loads onto the trailer. Because the winch is load bearing, the loaded trailer can be repositioned or towed at low speeds, via the winch, by the vehicle. Front and rear-mounted hitches allow the winch to be releasably attached thereto for self recovery of the vehicle from either direction.

20 Claims, 2 Drawing Sheets

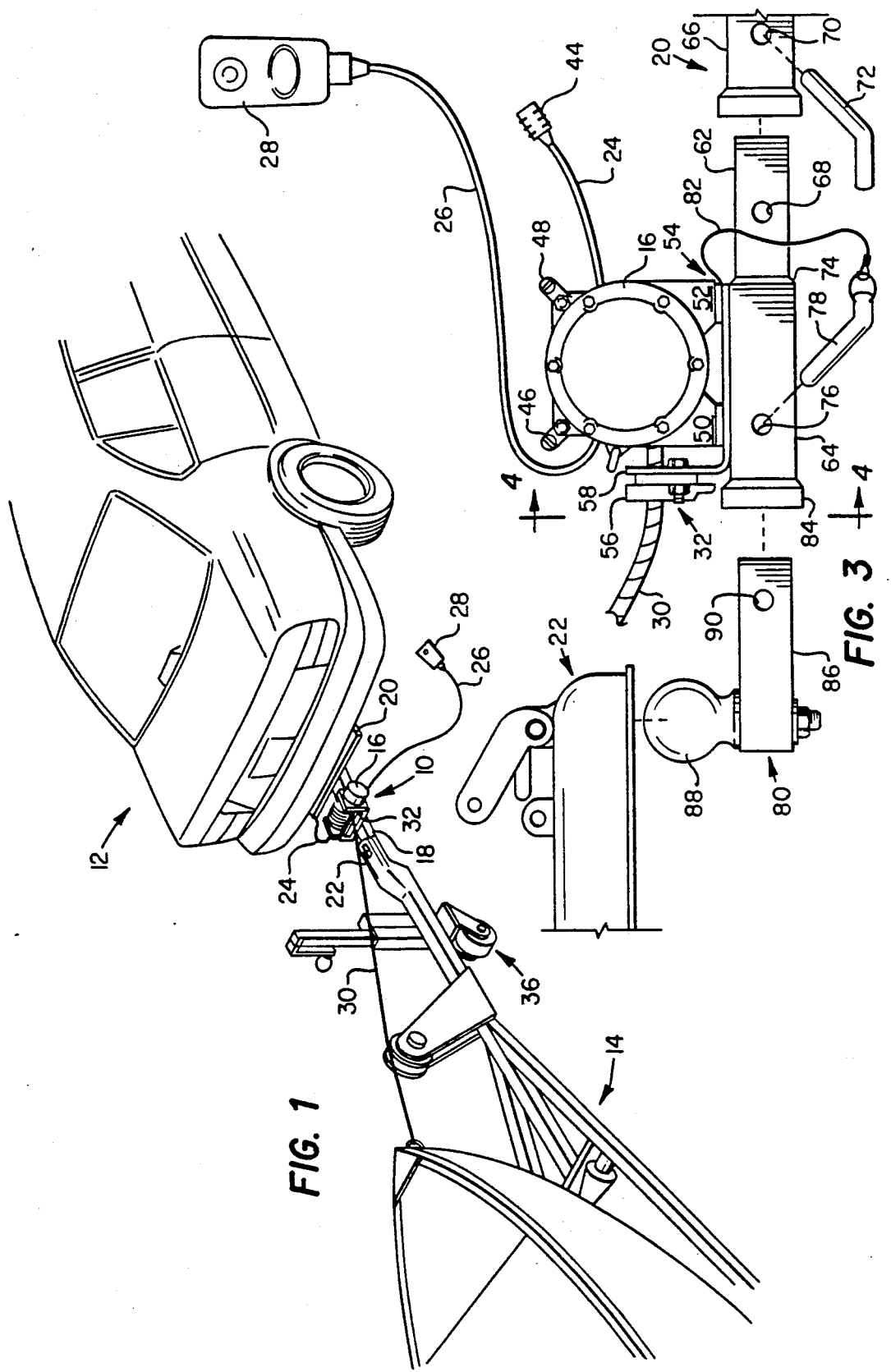

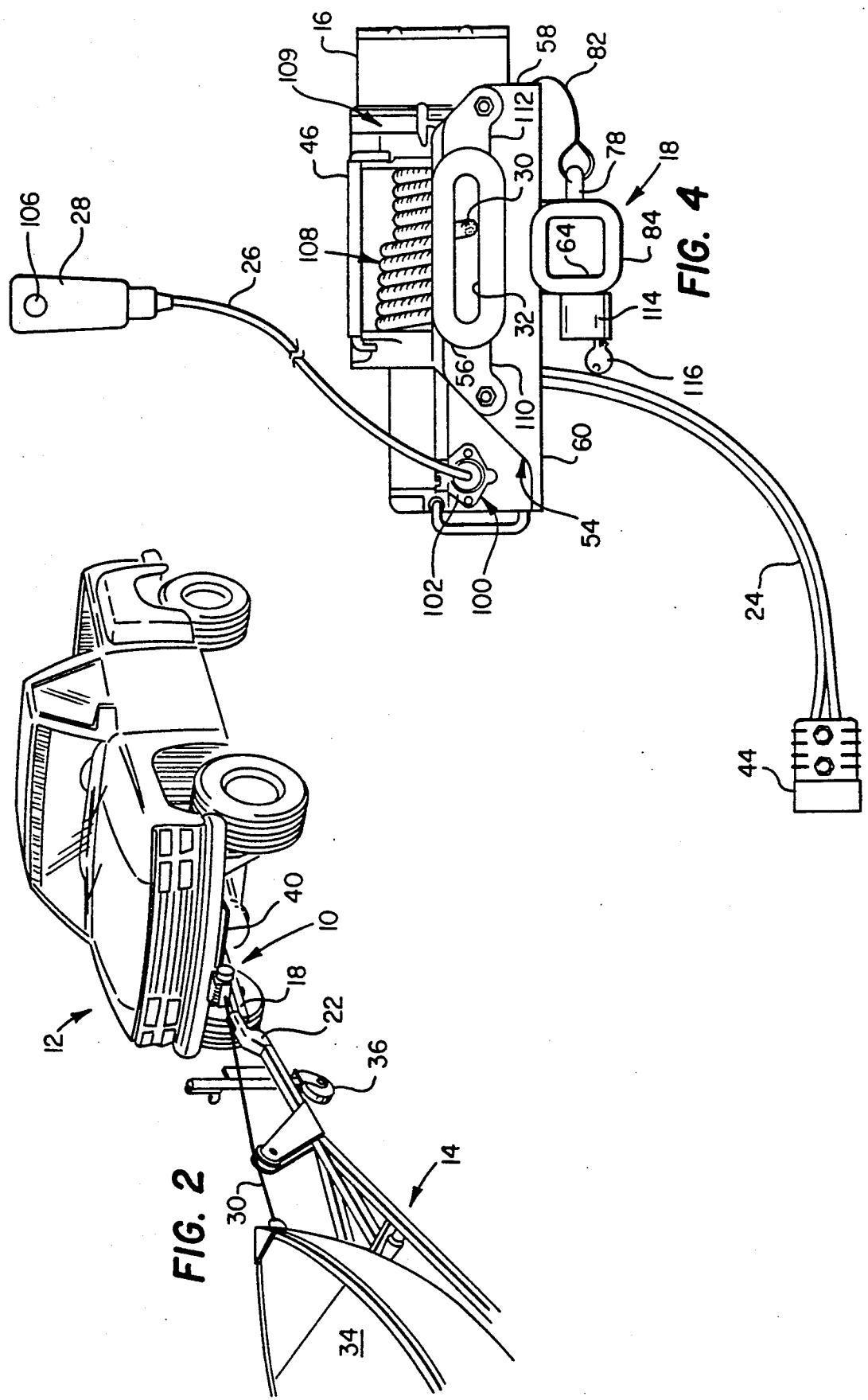

FRONT/REAR MOUNTED PORTABLE LOAD-BEARING WINCH

TECHNICAL FIELD OF THE INVENTION

The present invention relates in general to portable winches mounted to vehicles, and more particularly to load-bearing hitch-mounted winches, and methods of construction and uses thereof.

BACKGROUND OF THE INVENTION

Winches have been conventionally utilized to facilitate pulling loads or objects. It is well known in the art to permanently mount a winch on the front of a vehicle to enable the vehicle to extract itself from a river bed or muddy terrain. By permanently mounting the winch to the front of the vehicle, such vehicle can be extracted only if an anchor object, such as a tree, is in front of the vehicle. Extraction of such vehicle is much more difficult, if not impossible, if the only anchored objects are located behind the vehicle.

Another variety of applications involving winches includes vehicles to which trailers are mounted, such as boat trailers. In this situation, the winch is fixed to the boat trailer which is connected to a hitch mounted to the rear of the vehicle. While such winches are well adapted for drawing the load onto the trailer, the difficulty encountered is in backing the trailer, often in a blind situation, thereby necessitating the use of rear-view mirrors and reverse turning directions.

Rear hitch-mounted winches have been used advantageously to extract vehicles, but are thereafter removed. Disclosed in U.S. Pat. Nos. 3,159,368 and 3,718,317 are winches which are detachable from rear-mounted hitches. The structures of these winches loosely engage around a hitch ball to sustain a pulling load, but cannot sustain a downward load, such as experienced by a trailer or other transportable load attached thereto.

It can thus be seen that a need exists for a portable winch which can be easily, releasably mounted to the front or rear of a vehicle. There is also a need for a winch that is mountable to a vehicle hitch, and that is load-bearing as to other trailer equipment mounted to the winch. There is yet another need for a front-mounted hitch, which may be employed in connection with a load-bearing winch, for connection to trailers so that the trailers can be pushed by the vehicle.

SUMMARY OF THE INVENTION

In accordance with the present invention, the disclosed portable load-bearing winch, construction and use thereof substantially reduces or eliminates the disadvantages and shortcomings associated with the prior art winch structures. According to the invention, a portable winch is mounted to a drawbar structure having at one end a receptacle, and at the other end a stub. In the preferred embodiment of the invention, the drawbar is adapted for releasable engagement with a class 3 load-bearing vehicle hitch. The stub of the winch drawbar can be inserted into the hitch receptacle and pinned. A conventional ball-type hitch and plug can then be inserted into the winch drawbar receptacle. A trailer or other towable structure can be connected to the ball, thereby interposing the winch in the pulling train between the vehicle and the load. The cable of the power driven winch can be connected to the load so that it can be pulled onto the trailer.

In accordance with the invention, the vehicle can also be equipped with a hitch mounted to the front thereof, for releasable engagement with the portable load-bearing winch. With this arrangement, the winch can be mounted either at the back or the front of the vehicle so that it can tow or push loads and reposition such loads, as well as winch loads from the front or back of the vehicle. When the winch is mounted to the front of the vehicle, a trailer or other equipment can also be connected to the winch ball equipment so that the trailer can be pushed to a desired location. Moreover, when the winch is mounted to a frontal vehicle hitch it can be utilized to winch loads onto a trailer which is also connected to the load-bearing winch.

BRIEF DESCRIPTION OF THE DRAWINGS

Further features and advantages will become apparent from the following and more particular description of the preferred embodiment of the invention, as illustrated in the accompanying drawings in which like reference characters generally refer to the same parts or functions throughout the views, and in which:

FIG. 1 depicts the portable winch of the invention, interposed in the pulling train between a vehicle rear hitch and a trailer to reposition the load, or transport the load at low speeds;

FIG. 2 depicts the portable winch of the invention releasably connected between a vehicle frontal hitch, and a trailer which can be pushed by the vehicle;

FIG. 3 is an exploded side view of the portable load-bearing winch of the invention adapted for releasable connection between towing and towed vehicles; and FIG. 4 is an end view of the portable winch of the invention.

DETAILED DESCRIPTION OF THE INVENTION

There is illustrated in FIG. 1 one environment in which the invention may be advantageously practiced. The portable load-bearing winch 10 of the invention is shown connected between a vehicle 12 and a trailer 14. More particularly, the portable winch 10 includes a motor-driven winch 16 fastened to a winch drawbar 18. A frontal part of the drawbar 18 is releasably attached to a vehicle rear hitch 20, while a rear part of the winch drawbar 18 is connected to the trailer tongue 22. Preferably, the vehicle hitch 20 is of the class 3 type, rigidly fixed to the frame of the vehicle 12. In addition, the winch drawbar 18 is load bearing and thus can sustain both horizontal and vertical loads imposed thereon by the trailer 14 and its load. In the preferred embodiment, the winch 16 is motor driven, although the invention can be utilized with a hand-operated winch.

The motor-driven winch 16 is connected by power conductor 24 to the battery of the vehicle 12, via an intermediate connector (not shown). The electrical winch 16 also includes electrical umbilical conductors 26, terminated by a push button control unit 28. The control unit 28 includes two push buttons, one for controlling a clockwise rotation of the winch cable drum, and the other button for controlling the counterclockwise rotation of the cable drum.

Braided cable 30 exits the electrical winch 16 through a hawsehole 32 to prevent fraying of the cable strands. The cable 30 is shown connected to a boat 34 so that the boat can be loaded onto the trailer 14. When the boat 34 has been loaded onto the trailer 14, the winch drawbar 18 sustains the overall downward load, and thus the vehicle 12 can tow the loaded trailer 14 with the winch 10 interposed therebetween. Preferably, and for the purposes of safety, the winch 10 should remain in the pulling train either to reposition the loaded trailer on level ground so that it can be connected directly to the vehicle hitch, or for low speed short distance travel.

Alternatively, the auxiliary jack 36 of the boat trailer 14 can be lowered so that the portable winch 10 can be removed to thereby connect the loaded trailer 14 directly to the vehicle hitch 20 for long distance transport purposes. With further reference to FIG. 1, it can be appreciated that the portable winch 10 can be releasably engaged with the rear-mounted hitch 20 and employed to extract the vehicle by pulling the vehicle backwardly. The cable 30 need only be fastened to an anchor object (not shown) behind the vehicle for self-recovery purposes. The winch 10, being portable, can be easily carried in a plastic case, or otherwise, and stowed away in the vehicle for emergency use.

With reference to FIG. 2, the portable load-bearing winch 10 is shown connected to a front-mounted hitch 40 of the vehicle 12. The hitch 40 can be of a conventional class 3 load bearing type, bolted to the frame or undercarriage of the vehicle 12. While one end of the winch drawbar 18 is connected to the vehicle frontal hitch 40, the other end of the drawbar 18 is connected to the trailer tongue 22. Again, the winch 10 is load bearing, thereby being able to push or pull the loaded trailer 14. In accordance with an important feature of the invention, the driver of the vehicle 12 can simply look forward to easily guide the loaded trailer 14 to the desired location. In addition, guiding and turning of the trailer 14 is facilitated when connected to the front of the vehicle 12, as the turning directions are not reversed, as is the case when backing a trailer connected to the rear of a vehicle.

Alternatively, the portable winch 10 can be removed from the front-mounted vehicle hitch 40 so that the trailer 14 can be connected directly to the hitch 40. In this situation, the front-mounted hitch 40 of the invention can be utilized for connection to many different types of vehicular equipment for repositioning or moving the same from one location to another. As yet another alternative, a vehicle having a front-mounted hitch 40 can be recovered from mud, or the like, by simply engaging the winch 10 with the front-mounted hitch 40 and connecting the cable 30 to any anchor object located in the front of the vehicle 12. In this manner, the vehicle 12 can be pulled in a forward direction and recovered from the mud or stuck condition.

With reference now to FIG. 3, there is shown a side view of the portable load-bearing winch 10, as well as the other hitch apparatus to which it may be connected. The portable winch 10 is preferably motor driven with DC power readily available from the vehicle 12. Winches well adapted for use with the invention are available from the assignee hereof. One type particularly well adapted for passenger vehicle use is Model REP-5000. The electrical winch 16 includes an internal drum around which the cable 30 is wound. A DC motor mounted internal to the electrical winch 16 is gear driven to the drum for turning the drum in a clockwise or counterclockwise direction. The electrical winch 16 also includes a pair of solenoids controlled by the hand control unit 28 for operating the winch 16 so that the cable 30 is either wound around the drum, or is unwound therefrom. While not shown in FIG. 3, the control cable 26 is terminated in a waterproof quick-connect connector which is attachable to a control box of the electrical winch 16. Twelve or twenty-four volt power is supplied to the electrical winch 16 by way of the heavy duty cable 24 which is terminated by a plug 44. The plug 44 is mateable with a corresponding electrical plug fastened to the vehicle. In order to prevent the cable 30 from wrapping around the electrical winch 16 itself, a pair of tie bars 46 and 48 properly route the cable to the drum 108.

The legs 50 and 52 of the winch 16 are bolted, or otherwise fixed to a base 60 of an angle plate 54. The angle plate 54 is constructed of iron or steel of about ¼ inch thick to rigidly support the electrical winch 16 as well as a hawse structure 56. The hawse structure 56 is bolted to an upright part 58 of the angle plate 54. As noted above, the hawse structure 56 includes a hawsehole 32 having a rounded peripheral opening to allow the cable 30 to pass therethrough without being frayed. The upright part 58 of the angle plate 54 includes a corresponding, but larger hole, so that the cable 30 can pass therethrough without contacting the angle plate 54.

The base part 60 of the angle plate 54 is welded to the winch drawbar 18. The drawbar 18 is constructed of heavy duty square tubular material to provide load bearing capabilities. The winch drawbar 18 includes at one end thereof a square stub 62, and includes at the other end a square receptacle 64. The stub 62 includes an outer dimension which is adapted for fitting into a receptacle 66 of the vehicle hitch 20. The winch drawbar stub 62 includes a hole 68 therethrough which can be matched with a hole 70 in the hitch receptacle 66 so that a pin 72 can be passed therethrough to lock the winch drawbar 18 to the vehicle hitch 20. The pin 72 is of such diameter as to withstand the pulling loads expected to be exerted upon the portable winch 10. The drawbar stub 62 fits into the vehicle hitch receptacle 66 to the extent of about 6 inches so that the portable winch 10 can withstand substantial downward loads imposed thereon by trailer or other equipment connected thereto.

The winch drawbar receptacle 64 comprises square tubular stock having a sufficient internal diameter to receive therein the square drawbar stub 62. The hitch receptacle 64 is about 8 inches long, and is constructed of steel having a sidewall thickness of about ¼ inch, as is the drawbar stub 62. The drawbar receptacle 64 is welded at its back edge, such as shown by reference numeral 74 to the drawbar stub 62. Formed near a frontal part of the winch drawbar receptacle 64 is a hole 76 for receiving a pin 78 so that ball-type hitch equipment 80, or other apparatus, can be connected to the winch drawbar 18. The pin 78 is tethered by a small braided cable 82 which is riveted or otherwise fastened to the base 60 of the angle plate 54. A collar 84 is welded around the edge of the drawbar receptacle 64 to add rigidity and strength thereto so that turning loads imposed on the winch drawbar 78 do not tear or crack the edge of the receptacle 64.

As further illustrated in FIG. 3, ball-type hitch apparatus 80 is shown releasably engageable with the winch drawbar receptacle 64. The hitch apparatus 80 includes a square tubular or solid part 86 having bolted thereto a ball 88. The tubular part 86 includes a hole 90 which is alignable with the winch drawbar receptacle hole 76 when the parts are joined together.

A conventional trailer tongue 22 adapted for capturing the ball 88 can be employed for connecting the trailer 14 with respect to the vehicle hitch 20, via the portable load-bearing winch 10.

FIG. 4 illustrates the portable winch 10, as viewed from the trailer or load side thereof. As can be seen, the angle plate 54 includes an upright part 58 which has a large corner section thereof removed to provide easy access to an electrical connector 100. A corresponding connector 102 which terminates the cable 26 connected to the hand control unit 28, provides a waterproof electrical connection between the control unit 28 and the electrical winch 16. The connectors 100 and 102 are of conventional construction. The hand-held control unit 28 includes press-type momentary switches mounted on opposing sides thereof. One switch 106, when operated, allows the drum 108 of the electrical winch 16 to rotate in one direction, while the other switch located on the back side of the control unit 28 allows the drum 108 to be rotated in the opposite direction. The electrical winch 16 can be equipped with a manually operated clutch 109 for engaging or disengaging the winch motor from the drum. When engaged, the drum 108 can be rotated in the direction controlled by the switches of the hand-held control unit 28. However, when the clutch 109 is disengaged, the drum 108 freely rotates, thereby allowing the cable 30 to be quickly fed off of the drum.

As further noted in FIG. 4, a tie bar 46 is shown connected across the opening of the drum 108 to thereby control the wrapping of the cable 30 on the drum 108. The hawse 56 includes an elongate hawsehole opening 32 through which the cable 30 is routed. The hawsehole 32 includes a large radius of about ½ inch to prevent fraying of the cable 30, when the cable is in tension at a substantial angle with respect to the winch 16. The hawse 56 includes a pair of arms 110 and 112 which are bolted to the angle upright 58 and are thereby secured with respect to the winch drawbar 18.

The pin 78 which passes through the drawbar receptacle 64 is shown equipped with a lock 114. The lock 114 is of conventional construction for engaging with the end of the pin 78 and preventing removal thereof, unless unlocked by a key 116. The trailer or load can thus be secured to the portable winch 10.

From the foregoing, disclosed is a portable load-bearing winch which is releasably attachable to a front or back vehicle hitch and is adapted for bearing loads such as a trailer connected thereto. The portable winch includes stub and receptacle members so that it can be connected between a vehicle hitch and a trailer for repositioning the trailer or for low speed transport. Another advantage of the invention is that the winch is quickly and easily attachable and removable to front or back mounted vehicle hitches. Thus, when the winch is not in use, it can be easily disconnected and stowed in the trunk of the vehicle for later use. Because the winch can include in association therewith, front and rear-mounted vehicle hitches, or both, self recovery of the vehicle from either direction is thereby facilitated.

The environments or uses of the invention are not limited to use with utility or boat trailers as noted above. Indeed, the load-bearing winch of the invention can be utilized to pull a disabled vehicle on a wheeled dolly at safe low speeds. Also, while the winch of the invention is disclosed for use with square receptacle and stub drawbar elements, other shapes and types of connecting structures can be utilized. To that end, a trailer tongue other than the ball type can be used in conjunction with corresponding structures engageable with the winch.

While the preferred embodiment of the invention has been disclosed with reference to a specific winch structure and method of use, it is to be understood that many changes in detail may be made as a matter of engineering choices without departing from the spirit and scope of the invention, as defined by the appended claims.

What is claimed is:

1. Winch apparatus adapted for use in a pulling train between a vehicle having a hitch and a load, comprising:
   a winch;
   a drawbar rigidly connectable to the vehicle hitch so as to extend therefrom to define a downward load-bearing end without other support to the vehicle, saw drawbar including a first end constructed for releasable attachment to the vehicle hitch and the load-bearing end constructed for releasable attachment to the load; and
   means for fastening said winch to said drawbar so that said winch is anchored with respect to said vehicle and the load, but is removable with said drawbar from said vehicle hitch and said load.

2. The which apparatus of claim 1, further including an angle plate mounted to said drawbar, and wherein said winch is mounted to said angle plate.

3. The winch apparatus of claim 2, further including a hawse structure fixed to a vertical part of said angle plate, said hawse structure having a hawsehole through which a winch cable is routed.

4. The winch apparatus of claim 1, wherein said drawbar includes a square male and a square female end member adapted for supporting Class 3 loads.

5. The winch apparatus of claim 4, wherein said square male member is releasably engageable with a female hitch member.

6. The winch apparatus of claim 4, wherein said square female member is releasably engageable with a male load member.

7. The winch apparatus of claim 1, further including in combination a ball-type member attached to the back of said winch for towing a load.

8. The winch apparatus of claim 7, wherein said ball-type member is releasably attachable to the load-bearing end of the drawbar of said winch.

9. The winch apparatus of claim 1, wherein the first end of said winch drawbar is constructed so that when releasably attached to the vehicle hitch, said drawbar extended end can support pulling, lateral and downward loads.

10. The winch apparatus of claim 9, wherein said first end of said winch apparatus includes an elongate male member slidable into a vehicle hitch elongate female receptacle for supporting the lateral and downward loads, and a pin passing through the vehicle hitch and said drawbar to support pulling loads.

11. The winch apparatus of claim 10, wherein the load-bearing end of said drawbar includes an elongate female member for receiving an elongate male load member so that said drawbar can support lateral and downward loads, and a pin passing through the drawbar female member and the load male member to support pulling loads.

12. A portable load-bearing winch, comprising:
    a motor-driven winch;

a drawbar having an elongate male end with a hole therethrough for pinning to Class 3 vehicle hitch apparatus so as to be vertically and laterally rigid to support vertical, lateral and longitudinal loads without requiring other support with respect to said drawbar;

a support plate for mounting said winch to said drawbar;

a hawse for routing a cable of said winch to a load;

an electrical power cable connected to electrical apparatus for powering a motor of the winch; and a control unit connected to the winch for controlling the operation of the winch motor.

13. The winch of claim 12, further including in combination a ball-type member having a male part releasably attachable with a female end of said drawbar.

14. The winch of claim 12, further including in combination a pair of said hitches, one mountable to a rear of a vehicle and the other mountable to a front of the vehicle.

15. Portable winch apparatus, comprising:
a front hitch mountable to the front of a vehicle;
a rear hitch mountable to the rear of the vehicle;
a winch;
a drawbar to which the winch is mounted, said drawbar being releasable and rigidly mounted to support vertical and lateral loads to either said front or back mountable vehicle hitch.

16. The winch apparatus of claim 15, wherein each said hitch is of a Class 3 type load bearing, and when said winch is rigidly connected thereto, said winch is load bearing.

17. The winch apparatus of claim 15, wherein said drawbar includes an elongate end slidably engageable with an elongate hitch member so that when engaged, said winch supports downward loads.

18. The winch apparatus of claim 15, wherein said drawbar includes means for mounting thereto a load so that said winch supports the downward and pulling force of the load.

19. A method for transporting loads, comprising the steps of:
releasably attaching one end of a drawbar having a winch mounted thereto to a vehicle hitch;
attaching a towable vehicle to an opposing end of the drawbar, said drawbar being in a pulling train between the vehicle hitch and the towable vehicle;
winching a load on the towable vehicle using said winch; and
transporting the loaded towable vehicle at low speeds with the drawbar interposed between the vehicle hitch and the towable vehicle, with the drawbar-mounted winch being in the pulling train.

20. The method of claim 19, further including:
releasably connecting one end of the drawbar to a front hitch of the vehicle;
connecting the loaded towable vehicle to an opposing end of the drawbar; and
pushing the loaded towable vehicle to a desired location with the drawbar in the pushing train.

* * * * *

UNITED STATES PATENT AND TRADEMARK OFFICE
CERTIFICATE OF CORRECTION

PATENT NO. : 5,072,962
DATED : December 17, 1991
INVENTOR(S) : Robert W. Webb

It is certified that error appears in the above-identified patent and that said Letters Patent is hereby corrected as shown below:

Column 6, Line 18, delete "saw" and insert therefor --said--.

Column 6, Line 26, delete "which" and insert therefor --winch--.

Column 6, Line 45, after "winch" insert --apparatus--.

Column 7, Line 3, after "apparatus" insert --to which the drawbar is connected, said drawbar being removably attached to said Class 3 vehicle hitch apparatus--.

Signed and Sealed this

Twentieth Day of July, 1993

Attest:

MICHAEL K. KIRK

*Attesting Officer*     Acting Commissioner of Patents and Trademarks